Feb. 21, 1967  J. P. CHERNOCH  3,305,633
LASER OPTICAL SYSTEM
Filed June 26, 1963

Inventor
Joseph P. Chernoch
by Paul A. Frank
His Attorney

United States Patent Office 3,305,633
Patented Feb. 21, 1967

3,305,633
LASER OPTICAL SYSTEM
Joseph P. Chernoch, Schenectady, N.Y., assignor to General Electric Company, a corporation of New York
Filed June 26, 1963, Ser. No. 290,739
2 Claims. (Cl. 178—6.8)

My invention relates to an optical system which is adapted for nighttime viewing at a relatively long range, and in particular, to a pulsed laser optical system which employs the infrared region of the energy spectrum for obtaining enhanced contrast of a target area being viewed at nighttime.

The ability to view objects at a range of several miles and under conditions of substantially total darkness has presented many difficulties in the past. Such viewing as the surveillance of a battlefield area under nighttime conditions is not readily obtained since compact instruments having the required sensitivity to detect illumination of an extremely low level are not available at the present time. A system employing objective optics requires an objective lens with a focal length measured in hundreds of inches to obtain the necessary degree of resolution for such viewing. Since such a lens with the aperture ratio, or speed, required by existing television cameras and films would be many feet in diameter, it can be appreciated that a new approach is necessary to attain the desired sensitivity and resolution.

Therefore, an object of my invention is to provide an optical system which does not employ a large lens and is adapted for viewing at a relatively long range and under ambient illumination conditions of substantially total darkness.

A recent development has been the high sensitivity image orthicon tube, a device utilized in television cameras for producing the electrical signal which is transmitted to television receivers or monitors. The image orthicon is highly sensitive to varying degrees of illumination and permits observation for relatively short ranges under moonlight and starlight illumination.

A further object of my invention is to provide an optical system employing an image orthicon or television camera and a high intensity pulsed beam of radiation as the illuminant for viewing at a relatively long range under nighttime conditions.

In accordance with my invention in meeting the objects enumerated above, I provide a laser device for generating a pulsed beam of infrared radiation which is directed toward a target area located at a range of several miles therefrom. An image orthicon television chain comprising a television camera and monitor is employed to detect the infrared radiation reflected from the target area and to develop an optical image of such area. The reflectivity of the target area is increased upon irradiation by the infrared beam and the optical image developed by the television monitor has resultant enhanced contrast. A photographic camera may be employed to photograph the optical image displayed on the television monitor and thereby produce a permanent image of the target area. A gating or timing circuit synchronizes the operation of the television camera and photographic camera with the actuation of the laser device whereby the cameras are responsive to the reflected radiation during a predetermined interval of time following the generation of the laser pulse.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein:

A recently developed device, now conventionally described as a laser (light amplification by stimulated emission of radiation), provides a light output of exceptionally high intensity and directionality. The output of the laser is a very narrow beam of radiation which is in the visible or near visible frequency range of the electromagnetic energy spectrum. The intensity within the light beam is exceptionally high since the light is concentrated within the narrow beam and also because the output of a laser may be a coherent light, that is, the particles of light emitted are in phase with each. Further, the radiation output of a laser is confined within an extremely narrow spectral bandwidth. As referred to herein, light is assumed to include the visible and near visible, that is, includes the infrared and ultraviolet frequency ranges of the electromagnetic energy spectrum.

It can be appreciated that in an application such as nighttime surveillance of a battlefield area, it is highly desirable to minimize the possibility of detection of the illuminant device and observer or photographer. Thus, it is preferred to have an illuminant operable in the non-visible range of the electromagnetic energy spectrum such as the infrared or ultraviolet. It is also preferred to operate the illuminant on a pulsed rather than continuous basis to further prevent detection of such irradiation by known means. Finally, it is known that the narrow spectral band infrared radiation from a laser provides spectral discrimination within the viewed area, that is, increases the reflectivity of many materials which are irradiated thereby. Thus, an optical image of a target area being irradiated by such infrared beam has enhanced contrast as compared to an optical image obtained under visible light or daylight conditions. The infrared region of the energy spectrum, therefore, appears to be the more desirable of the two near visible regions of the spectrum for utilization as an illuminant for a selected target area which may be located at a relatively long distance from the illuminant. Finally, the selection of the infrared region is made practically necessary since the majority of the laser materials, as presently developed, emit radiation in such portion of the energy spectrum.

Figure 1:
FIGURE 1 represents a photograph which indicates the enhanced contrast obtained under nighttime conditions in accordance with my invention.
Figure 2:
FIGURE 2 is a photograph of the target area of FIGURE 1 under daylight conditions.

FIGURE 1 illustrates a photograph taken of a selected target area under ambient illumination condition approaching total darkness. The photograph was taken with the laser optical system to be described in detail hereinafter and on a night of heavy overcast whereby illumination from the moon or stars was negligible. The illustrated target area comprises a variety of foliage and the specific target consists of four spaced wooden posts, the two center posts being only slightly spaced and having cross bars mounted at the top to form a square. FIGURE 2 is a photograph of the target area of FIGURE 1 but taken under daylight conditions. A comparison of FIGURES 1 and 2 indicates that enhanced contrast is obtained by employing an infrared illuminant. The foliage is more readily distinguishable and the target of four posts is especially pronounced. The laser illuminant also provides an inherent advantage of visible illuminants which are employed for nighttime viewing, that is, the field of view behind the selected target area is rendered increasingly imperceptible with increasing distance from the target area. Viewing under daylight conditions cannot effectively exclude such background.

A direct photographic method for viewing a selected target area wherein the optical system merely comprises a laser device for generating laser pulses and a photographic camera for detecting and recording the reflected radiation is obviously a most simple method for viewing at relatively long range under nighttime conditions. However, the direct photographic method is impracticable since the response of present day photographic film emulsions is not sufficiently sensitive to infrared radiation.

An indirect method, using an image orthicon television chain as an infrared detector and image intensifier, permits photographs to be taken in the infrared region with 40 times the sensitivity of the direct photographic method and equivalent resolution. An image orthicon television chain is a closed circuit television system comprising a television camera which includes an image orthicon tube, and a television receiver that includes a monitor screen for providing an optical image of the target area detected by the image orthicon. The spectral response of a suitable image orthicon tube tube, such as the type Z-5395 or Z-5396 manufactured by the General Electric Company provides exceptionally high sensitivity and resolution in the infrared region. The image orthicon is not subject to reciprocity effect from which photographic films suffer. Reciprocity effect may be described as the inherent inability of photographic film to sense a particular amount of light existing over an extremely short duration of time with the same efficiency as such amount of light extended over a longer duration of time. Thus, the image orthicon is especially adapted for the subject application which utilizes laser pulses having durations generally of the order of one millisecond. Further, the detected image may be stored in the image orthicon tube for a few seconds thereby permitting several sequential laser pulses to illuminate the target area and provide a period of integration before an electron beam reads out the stored information in the image orthicon tube. A photographic camera may be employed to photograph the television monitor screen and thereby obtain a permanent record of the target area.

Figure 3:
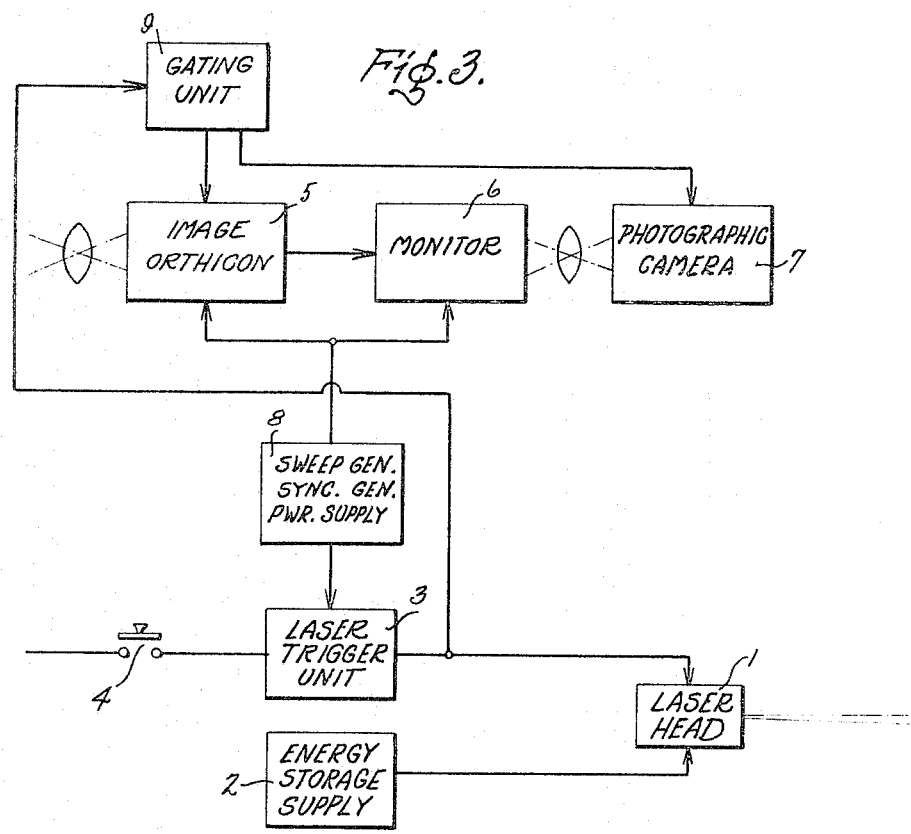
FIGURE 3 is a block diagram of my pulsed laser optical system.

FIGURE 3 illustrates a block diagram of a particular embodiment of a pulsed laser optical system constructed in accordance with my invention. The laser consists of a laser head 1 and a high energy storage supply 2. Laser head 1 comprises a 12 inch diameter cylindrical housing having a highly reflective inner surface. The particular embodiment employs a ruby rod 0.6 inch diameter by 8 inches long and a xenon flash lamp contained within the housing. The end faces of the ruby rod are coated with dielectric film with 100 percent and 50 percent reflectances. The ruby rod and xenon lamp are mounted axially near the center of the housing which has flat reflecting end plates. Energy storage supply 2 is the main power supply for the laser head and comprises a high voltage charging circuit for supplying high voltage pulses to the flash lamp. Such voltage pulses are adjustable in duration from approximately 2 to 12 milliseconds. The energy output rating of supply 2 is sufficient to generate laser pulses having an output of 50 to 100 joules. It should be understood that for my particular application of the laser device, the energy rating of energy storage supply 2 is primarily determined by the energy level of the generated laser pulse, the efficiency of the laser device, and the sensitivity of the receiving equipment. At the present time, rapid advances are being made in the laser field, and the resultant higher efficiency of the future laser device will decrease the required energy rating of supply 2 by at least one order of magnitude. Increased sensitivity of future receiving equipment, such as highly sensitive infrared photographic film, will reduce the required energy level of the laser pulse and thus further reduce the rating of supply 2.

Laser trigger unit comprises an election pulser of conventional circuitry for actuating the flash lamp at the appropriate times. The operation of the trigger unit may provide a single laser pulse or may be programmed whereby each sequence is begun by pressing push button 4. The laser rod releases electromagnetic energy stored in discrete metastable states as a result of being excited by an electromagnetic signal of the correct frequency. Thus, the flash lamp excites or optically pumps the laser rod into a metastable higher energy state whereby a stimulated emission of relatively monochromatic and directional electromagnetic radiation is emitted from one end of the rod. This electromagnetic radiation or light is emitted in a plane wave having a very small divergence which concentrates the output energy of the laser into a beam of intense infrared radiation.

The apparatus for receiving the reflected infrared radiation from the target area may be disposed adjacent the laser apparatus which generates the incident light or radiation, or it may be positioned at some distance therefrom. As an example, the laser apparatus and reflected radiation receiver apparatus may form a 30 degree angle with the selected target area. The receiving apparatus comprises an image orthicon television chain including an image orthicon tube 5 as part of a television camera, and a television monitor 6. Image orthicon 5 as hereinabove described is highly sensitive to low levels of illumination. The electrical output of image orthicon 5 is connected to the input of monitor 6 which converts the electrical signals to an optical image or television picture. A conventional photographic camera 7 is positioned in optical communication with monitor 6 to permit photographing of the monitor screen and thereby obtain a permanent record or picture of the target area being irradiated by the laser. Conventional electronic circuits such as a sweep generator, synchronizing generator, and power supply 8 are electrically connected to the image orthicon circuit 5, the monitor circuit 6, and the laser trigger circuit 3 to obtain properly synchronized operation of the various circuit elements. The output of laser trigger unit 3 is electrically connected to a gating circuit or unit 9 and the output of this gating circuit is connected to the image orthicon or television camera 5 and photographic camera 7. The gating unit actuates the television camera and photographic camera upon initiation of the laser trigger unit and thereby renders the two cameras responsive to the reflected radiation for a predetermined interval of time as determined by the duration of the laser pulse and the range of the selected target area being irradiated. This selective responsiveness of the two cameras prevents undesired radiation, occurring at intervals other than during the operation of my pulsed laser optical system, from degrading the optical image being recorded.

From the foregoing description, it can be appreciated that my invention makes available a new system for viewing at relatively long range, such as several miles, and under ambient illumination conditions of substantially total darkness. The system, as employing a ruby laser, operates at the edge of the infrared spectrum in order to obtain optical images of enhanced contrast whereby the selected target area is clearly distinguished. The use of pulsed infrared radiation also provides a viewing system which is virtually undetectable.

Having described a new system application for a laser device, it is believed obvious that modifications and variations of my invention are possible in the light of the above teachings. Thus, a series of laser pulses rather than a single one may be employed to irradiate a selected target area and thereby obtain longer range viewing. Further, laser materials other than ruby such as neodymium activated glass can be employed for operation in the invisible infrared spectrum and future development of a high power laser which emits radiation in the ultraviolet region may permit a direct photographic method of viewing at relatively long range under nighttime conditions. The use of ultraviolet radiation would exclude the enhanced contrast feature obtained with infrared radiation, however, it would have the advantage of also excluding the image orthicon television chain. In like manner, a direct photographic method for obtaining a permanent image with enhanced contrast may be obtained in the future on development of a photographic emulsion sufficiently sensitive to infrared radiation. It is, therefore, to be understood that changes may be made in the particular embodiment of my invention described which are within the full intended scope of the invention as defined by the following claims.

What I claim as new and desire to secure by Letters Patent of the United States is:

1. An infrared optical system adapted for viewing at a relatively long range under conditions of extremely low ambient illumination comprising
    means for generating a pulsed narrow, pulsed beam of infrared radiation directed toward a selected target area located at a relatively long distance therefrom, each pulse of radiation having a duration in the range of 2 to 12 milliseconds and an energy output in the range of 50 to 100 joules,
    means highly sensitive to extremely low levels of illumination in the infrared region for detecting infrared radiation being reflected by said target area and for intensifying an optical image thereof, means connected to an output of said detecting and image intensifying means for producing a temporary image of said target area under ambient illumination conditions of substantially total darkness, and
    means in optical communication with said temporary image producing mean for photographing the temporary image of said target area to thereby record a permanent image of said target area under ambient illumination conditions of substantially total darkness by an indirect photographic method having approximately 40 times the sensitivity of direct methods of photographing said target area under similar illumination conditions, and
    means for synchronizing said detecting and image intensifying means and photographing means with said radiation generating means whereby said dectecting means and photographing means are responsive to the reflected radiation during only a predetermined interval of time thereby preventing undesired radiation occurring at intervals other than during the operation of said infrared optical system from degrading the optical image being permanently recorded.

2. A laser optical system adapted for viewing a target area at a relatively long range under ambient illumination conditions of substantially total darkness and for recording a permanent image of the target area by an indirect photographic method comprising
    a laser device for generating a high intensity, pulsed beam of incident radiation directed toward a selected target area located at a relatively long distance therefrom, each pulse of radiation having a duration in the range of 2 to 12 milliseconds and an energy output in the range of 50 to 100 joules,
    an image orthicon television chain comprising an image orthicon tube for detecting extremely low levels of radiation being reflected by said target area and for intensifying the optical image thereof and a television monitor for producing a temporary image of the intensified optical image of said target area,
    a photographic camera in optical communication with said monitor for recording a permanent image of said target area by an indirect photographic method having approximately 40 times the sensitivity of direct methods of photographing said target area under similar illumination conditions, and
    means for synchronizing the image orthicon tube and photographic camera with the laser device whereby said image orthicon tube and photographic camera are responsive to the reflected radiation during only a predetermined interval of time to prevent undesired radiation occurring at intervals other than during the operation of said laser optical system from degrading the optical image being recorded and the system is adapted for viewing under ambient illumination conditions of substantially total darkness.

References Cited by the Examiner

UNITED STATES PATENTS

| | | | |
|---|---|---|---|
| 2,859,275 | 11/1958 | Maurer | 178—7.4 |
| 2,996,946 | 8/1961 | Brendholdt | 178—7.2 X |
| 3,213,281 | 10/1965 | Nedderman | 250—199 |

OTHER REFERENCES

Popular Science, "The Month in Science" October 1960, pages 25–26. Q 1. p. 8.

Electronics, "Lasers-Part III" November 10, 1961, pages 81–85. TK 7800 E 58.

DAVID G. REDINBAUGH, *Primary Examiner.*

ROBERT L. GRIFFIN, *Examiner.*

H. W. BRITTON, *Assistant Examiner.*